April 26, 1932.  D. J. McCORMACK ET AL  1,855,721
DRAFT TUBE FOR WATER TURBINES
Filed Dec. 20, 1924   2 Sheets-Sheet 1
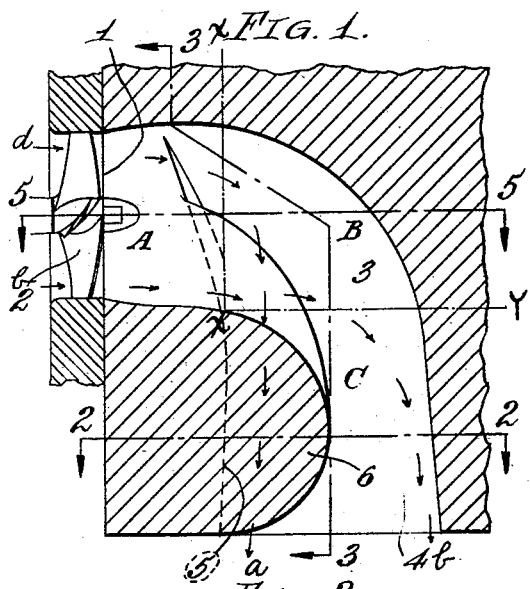
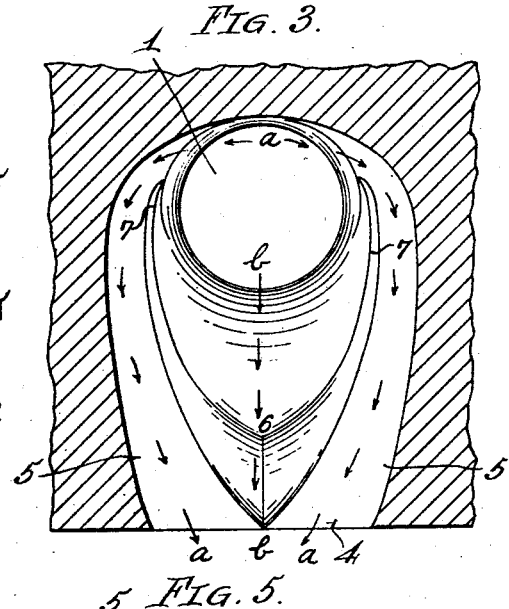
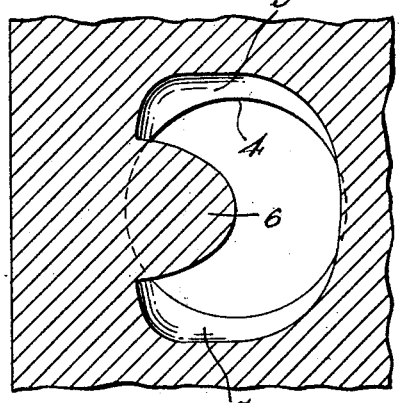
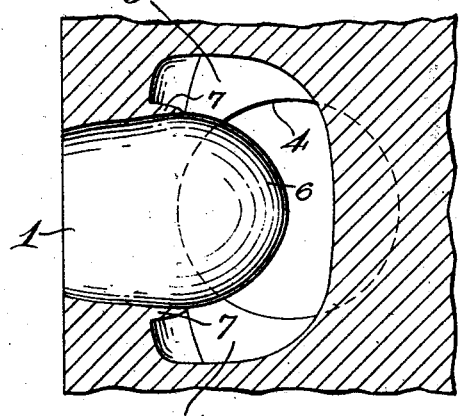
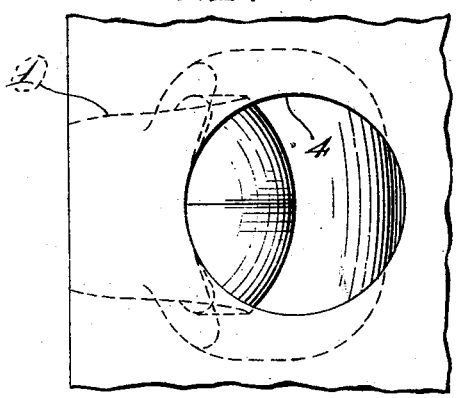
Inventors
Daniel J. McCormack
+
Karl A. Enz
By Brockett Hyde + Melburn
Attorneys

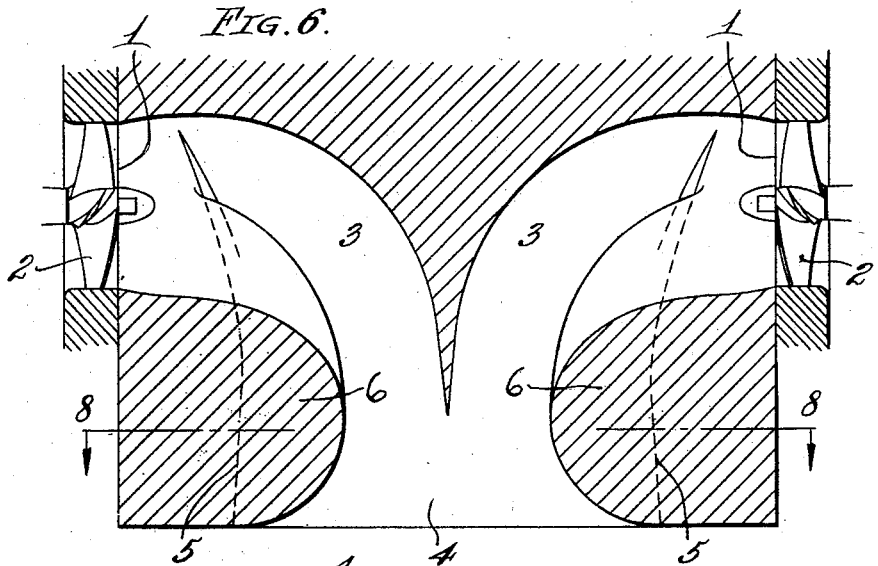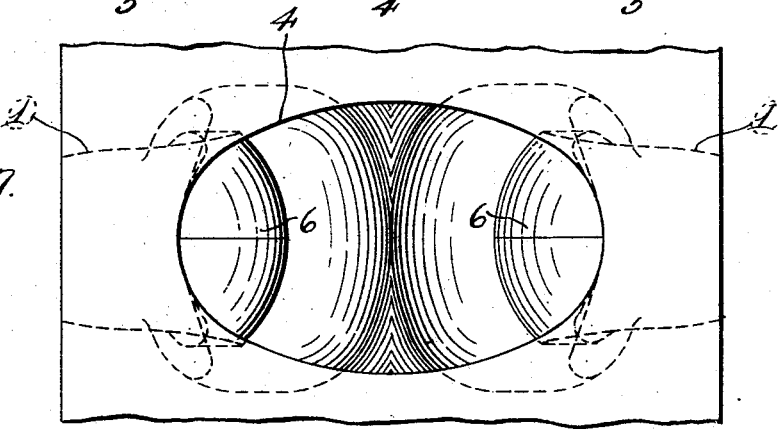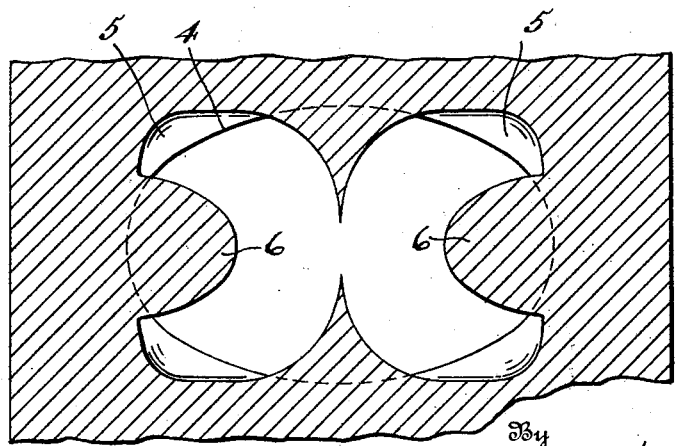

Patented Apr. 26, 1932

1,855,721

UNITED STATES PATENT OFFICE

DANIEL J. McCORMACK, OF YORK, PENNSYLVANIA, AND KARL A. ENZ, OF CLEVELAND, OHIO

DRAFT TUBE FOR WATER TURBINES

Application filed December 20, 1924. Serial No. 757,212.

The present invention relates to improvements in discharge passages, commonly called draft tubes, for hydraulic turbines. Reference is made to our copending application, Ser. No. 583,184, filed August 21, 1922, and later abandoned.

We have evolved certain theories according to which we have proceeded in devising our improvements. Briefly, we have discovered that by devising and designing the present device so as to direct the water flowing therethrough along its most natural course of flow, we are enabled to create a vacuum in the draft tube and thereby increase to an appreciable degree the efficiency of the turbine. The water from the runner has a high velocity as it reaches the elbow or quarter-turn in the discharge passage, but by reducing to a minimum the resistance to its flow, the losses of power due to choking effect are likewise reduced to a minimum. Likewise, by discharging the water through the elbow at a uniform rate of reduction in velocity, the eddy or counter-currents are reduced to a minimum so that the water is free to flow without obstruction. We have discovered that the water in discharging through the elbow has a natural tendency to cling to the surface or outer wall of the same, thereby creating a hollow center and setting up eddy currents with the resultant objectionable choking effect which reduces the efficiency of the turbine.

It is with these considerations in mind that we have devised the present refinements. In brief, we have so devised the present form of passage that it might be regarded as comprising an entrance portion which receives the flow of water directly from the runner of the turbine, and exit or discharge portion which delivers the same to the tail race, and an intermediate part which joins the entrance and exit portions, all of which three portions together constitute a draft tube in which is incorporated a quarter-turn or elbow. In the present case, we have somewhat flattened the passage approximately at its portion of maximum curvature, but have provided comparatively deep side channels so that the casing is adapted for the discharge of the water in a manner approximating most closely its natural flow. In this connection we should explain that we have discovered also that the water as it reaches the end of the entrance portion of the passage has a tendency to curl up and toward the sides of the casing; and it is because of this tendency that we have devised the side channels so as to carry off the water along its most natural lines of flow and with the least possible resistance or counter-currents.

We have discovered also that by constructing the middle portion of curved conformation, we are enabled to reduce the width of the discharge casing and thereby economize to a considerable degree the space required and save on construction costs. Such a reduction in the width of the discharge casing is accompanied by an increase in the depth of the side channels so as to provide ample capacity for carrying off the full flow of water.

Referring to the drawings, Fig. 1 is a longitudinal sectional view of an example illustrative of our improved form of discharge casing, the example chosen having a horizontal entrance and vertical exit; Fig. 2 is a view taken on line 2—2 of Fig. 1; Fig. 3 is a view taken on line 3—3 or Fig. 1; Fig. 4 is a bottom view; Fig. 5 is a section taken on line 5—5 of Fig. 1; and Figs. 6, 7 and 8 illustrate the duplex form of discharge casing, Fig. 7 being an inverted plan view and Fig. 8 a sectional view on line 8—8 of Fig. 6.

The entrance part A of the passage directs the flow of water from the runner 2 of the turbine and is of a somewhat tapering form which merges into the intermediate part B. The intermediate part B is curved and directs the flow of water out through the exit part C, the outlet end 4 of which is of circular form as is also the inlet end 1 of the entrance part A. The exit part C is preferably made of the generally oval conformation indicated by Fig. 5. These portions A, B and C of the passage may be considered generally as separated by the vertical and horizontal dot dash lines $x$—$x$, $x$—$y$ appearing in Fig. 1.

The exact conformation of the passage is difficult of description, although clearly appearing from the drawings, but in general the intermediate and exit portions are modified by a heart shaped projection 6, laterally extending into what would otherwise be a portion of the passage, and of the curved surface formation indicated, the upper portion (Figs. 1 and 3) of this projection being concaved to correspond with the entrance opening of the draft tube and split towards the inlet portion into a pair of ridges 7 whereby two laterally spaced and comparatively deep generally vertical channels 5 are formed. The passage is laterally enlarged adjacent the projection 6, and the side walls 8 gradually converge towards the discharge opening 4, as appears from Fig. 3; the net result however, being a passage of increasing cross sectional area and consequently capable of diminishing the velocity of the flow therethrough.

Since the water from the runner has a high velocity at the entrance to the draft tube, any resistance or choking effect in the passage would be magnified even though the obstruction to the natural flow be only comparatively small. As above briefly explained, the provision of the projection 6 tends to prevent eddy currents in this part of the discharge passage by restricting the flow of water to the outer portion of the curves therein, which represents the more natural flow and consequently tends to relieve any resistance to the flow. It is to be understood that this same form of elbowed draft tube may be constructed in a single or double form, according to whether the turbine is single or duplex, and the same principles may be employed in other varying forms of quarter-turns or elbows in connection with single or double discharge passages used for any other purpose. In case of a twin or double horizontal turbine having two runners which discharge to a common central draft tube, the two supplementary parts are each of substantially semi-circular form and merge together to form a substantially elliptical form where they join into the one common discharge opening to the draft tube. This is illustrated on sheet 2 of the drawings, corresponding parts of the duplex discharge passage being otherwise the same as already described in connection with the single passage.

Thus we have devised a draft tube in which the several features cooperate in directing the flow of water so as to be carried off from the turbine along its most natural course and hence with the least possible counter-currents or resistance and choking effect which have hitherto proved so objectionable with respect to the efficiency of the turbine. For instance, with our improved form of discharge casing, we have found by actual experimentation and test that when used in connection with a horizontal turbine, the difference in efficiency of the turbine increases directly with and in proportion to the increase in opening of the turbine gates, even up to full opening; whereas, heretofore, there has been a decided falling off in power and efficiency of the turbine from seven-tenths opening up to full opening of the gates.

What we claim is:

1. In a draft tube, a casing having a passage therethrough, said passage having an entrance part, an exit part at a substantial angle thereto, and a bent intermediate part, said passage being widened at the intermediate part, the intermediate and exit parts converging transversely toward the exit mouth, the passage wall of said casing being continuously concave along the outside of the bend, and said casing projecting into said passage inwardly along the bend to direct liquid entering said passage inwardly of the bend toward the wall of the exit passage outward of the bend, and to direct liquid entering said passage outwardly of the bend laterally of said intermediate part.

2. In a draft tube, a casing having a passage therethrough, said passage having an entrance part, an exit part at a substantial angle thereto, and an intermediate portion communicating therebetween to form a bend, said passage being widened at the intermediate part and said intermediate and exit parts converging transversely to the exit mouth, the passage wall of said casing being continuously concave along the outside of the bend, and said casing projecting into said passage inwardly along the bend and being of maximum convexity along the exit part thereof to direct liquid entering said passage inwardly of the bend toward the wall of the exit part of the passage outward of the bend, and to direct liquid entering said passage outwardly of the bend laterally of the intermediate part.

3. In a draft tube, a casing having a passage therethrough, said passage having an entrance part, an exit part at a substantial angle thereto, and an intermediate part communicating therebetween to form a bend, said entrance and exit parts having circular mouths, said passage being widened at the intermediate part and converging transversely toward the exit mouth, the passage wall of said casing being continuously concave along the outside of the bend, and said casing projecting into said passage generally inwardly of the bend therein with maximum projecting dimension along the exit portion thereof to direct liquid entering said passage inwardly of the bend toward the wall of the exit part outward of the bend, and to direct liquid entering said passage outwardly of the bend laterally of the intermediate part, said convergence being adapted to direct the laterally directed liquid toward that portion of the exit mouth inward of the bend.

4. In a draft tube, a casing having a passage therethrough, said passage having an entrance part, an exit part at an angle thereto, and an intermediate part communicating therebetween to form a bend, said passage being widened at the intermediate part and said intermediate and exit parts converging transversely toward the exit mouth, the passage wall of said casing being continuously concave along the outside of the bend, and said casing being formed with a portion projecting into said passage generally inwardly of the bend therein and of maximum projecting dimension along said exit portion thereof.

5. In a draft tube, a casing having a passage therethrough, said passage having an entrance part, an exit part at an angle thereto, and an intermediate part communicating therebetween to form a bend, said entrance and exit parts having circular mouths, said passage being widened at the intermediate part and converging transversely toward the exit mouth, the passage wall of said casing being continuously concave along the outside of the bend, and said casing being formed with a portion projecting into said passage generally inwardly of the bend therein and of maximum projecting dimension along said exit portion thereof.

6. In a draft tube, a casing having a passage therethrough, said passage having an entrance part, an exit part at a substantial angle thereto, and an intermediate part communicating therebetween to form a bend, said passage being widened at the intermediate part and converging transversely toward the exit mouth, the passage wall of said casing being continuously concave along the outside of the bend, and said casing being formed with a portion projecting into said passage generally inwardly of the bend, of maximum projecting dimension centrally of said exit part, the projecting portion terminating in the direction of the exit portion with converging lateral surfaces, and in the direction of the entrance part with a pair of ridges separated by an anticlastic surface, said ridges separating the widened portion of said passage into a central channel and a pair of channels lateral thereof.

7. In a draft tube, a casing having a passage therethrough, said passage having an entrance part, an exit part at right angles thereto, and an intermediate part communicating therebetween to form a bend, said passage being widened at the intermediate part and converging transversely toward the exit mouth, the passage wall of said casing being continuously concave along the outside of the bend, and said casing being formed with a portion projecting into said passage generally inwardly of the bend therein, of maximum projecting dimension centrally of said exit portion thereof, the projecting portion terminating substantially at the exit part with converging convex surfaces, and in the direction of the entrance with a pair of ridges separated by an anticlastic surface, said ridges separating the widened portion of said passage into a central channel and a pair of channels lateral thereof.

8. In a draft tube, a casing having a passage therethrough, said passage having an entrance part, an exit part at right angles thereto, and an intermediate part communicating therebetween to form a bend, said passage being widened at the intermediate part and converging transversely to the exit mouth, the passage wall of said casing being continuously concave along the outside of the bend, and said casing being formed with a portion projecting into said passage generally inwardly of the bend, of maximum projecting dimension along said exit portion thereof, the projecting portion terminating in the direction of the exit with converging lateral surfaces, and in the direction of the entrance with a pair of ridges separated by an anticlastic surface, said ridges separating the widened portion of said passage into a central channel generally in the direction of the entrance part and a pair of channels lateral thereof generally in the direction of the exit part.

9. An elbow draft tube having an entrance part, an exit part at a substantial angle thereto, and an intermediate part communicating therebetween to form a bend, said tube being continuously concave along the outside of the bend, and wider at its intermediate part than at its other parts, and having at the inside of the bend a projection extending into the passage at said widened part.

In testimony whereof, we hereby affix our signatures.

DANIEL J. McCORMACK.
KARL A. ENZ.